United States Patent
Krysztal et al.

(10) Patent No.: US 11,222,359 B2
(45) Date of Patent: Jan. 11, 2022

(54) SYSTEMS AND METHODS FOR LOCATION RELATED EVENT DETECTION

(71) Applicant: MasterCard International Incorporated, Purchase, NY (US)

(72) Inventors: Javier Krysztal, Miami, FL (US); Matias Sevi, Aventura, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 594 days.

(21) Appl. No.: 15/798,532

(22) Filed: Oct. 31, 2017

(65) Prior Publication Data

US 2019/0130447 A1 May 2, 2019

(51) Int. Cl.
*G06Q 30/02* (2012.01)
*H04L 29/06* (2006.01)
*G06F 16/9535* (2019.01)
*G06Q 10/06* (2012.01)

(52) U.S. Cl.
CPC ..... *G06Q 30/0259* (2013.01); *G06F 16/9535* (2019.01); *G06Q 30/0205* (2013.01); *H04L 63/083* (2013.01); *G06Q 10/06393* (2013.01); *H04L 63/10* (2013.01)

(58) Field of Classification Search
CPC .......... G06Q 30/0259; G06Q 30/0205; G06Q 10/06393; G06F 16/9535; H04L 63/083; H04L 63/10
See application file for complete search history.

(56) References Cited

U.S. PATENT DOCUMENTS

| | | | |
|---|---|---|---|
| 9,003,030 B2 | 4/2015 | Miller et al. | |
| 9,117,238 B2 | 8/2015 | Tapley et al. | |
| 9,373,078 B1* | 6/2016 | Olsson | G06F 16/2462 |
| 9,607,318 B1 | 3/2017 | Gerchikov et al. | |
| 2010/0197318 A1 | 8/2010 | Petersen et al. | |
| 2010/0250310 A1* | 9/2010 | Locherer | G06Q 10/0639 705/7.38 |
| 2012/0046049 A1 | 2/2012 | Curtis et al. | |
| 2012/0185309 A1 | 7/2012 | Kakarla et al. | |

(Continued)

OTHER PUBLICATIONS

"Mastercard launches new API developer platform" (Press release, available at https://newsroom.mastercard.com/eu/press-releases/mastercard-launches-new-api-developer-platform/ on Sep. 28, 2016) (Year: 2016).*

*Primary Examiner* — James M Detweiler
(74) *Attorney, Agent, or Firm* — Armstrong Teasdale LLP

(57) ABSTRACT

An event detection (ED) computing device is provided. The ED computing device includes a processor in communication with a memory. The processor is configured to receive real time data from a real time data source, including location data and transaction data, and calculate a first data derivative based at least in part on the received location data and transaction data. The ED computing device is also configured to identify an event associated with the first location based at least in part on the received location data and transaction data and store an identified event data structure in a database. The ED computing device is configured to retrieve notification rules associated with a first stakeholder, compare the a data derivative to the notification rules, and transmit a notification to the first stakeholder based at least in part on the comparison.

15 Claims, 7 Drawing Sheets

(56) References Cited

U.S. PATENT DOCUMENTS

| | | |
|---|---|---|
| 2012/0209657 A1 | 8/2012 | Connolly |
| 2012/0215614 A1 | 8/2012 | Hochstatter et al. |
| 2014/0006096 A1 | 1/2014 | Groarke |
| 2014/0278971 A1 | 9/2014 | Neubert et al. |
| 2015/0006244 A1* | 1/2015 | Tietzen .............. G06Q 30/0201 705/7.29 |
| 2015/0073954 A1* | 3/2015 | Braff ...................... G06Q 40/00 705/30 |
| 2015/0170382 A1* | 6/2015 | Bhatia ................... G06F 16/252 345/440 |
| 2015/0242748 A1 | 8/2015 | Unser et al. |
| 2015/0242869 A1 | 8/2015 | Unser et al. |
| 2016/0034925 A1* | 2/2016 | Unser ................ G06Q 30/0202 705/7.31 |
| 2016/0148092 A1 | 5/2016 | Chauhan |
| 2016/0335649 A1* | 11/2016 | Ghosh ................... H04L 63/083 |
| 2017/0103374 A1 | 4/2017 | Bhattacharjee et al. |
| 2017/0193491 A1 | 7/2017 | Phipps |

\* cited by examiner

SYSTEMS AND METHODS FOR LOCATION RELATED EVENT DETECTION

BACKGROUND

The field of the disclosure relates generally to analyzing real time location data, and more specifically to methods and systems for detecting events based at least in part on real time data containing location information.

Contemporary business-related computing systems, such as computing systems for arranging travel or payment processing networks, generate immense amounts of data during operation. Due to the expansive domain of data generated by these systems at least some trends within the data may go undetected. Moreover, these trends may be time-sensitive and limit the benefit of analyzing the data at a later time to detect such trends. For example, a surge in last-minute hotel reservations in a geographic area may be relevant to nearby merchants, but may also be difficult to identify within data containing hotel reservations across multiple geographic areas.

At least some merchants allocate and/or manage their resources (e.g., employees, products, advertisements, offers, etc.) to meet customer and client demand without excessive expenditures. To allocate resources, the merchants may try to predict the customer and client demands in advance. For example, a merchant may attempt to identify an upcoming event near the merchant and allocate more resources for more potential customers. However, manual event identification is time consuming and expensive. Moreover, the difficulty of detecting trends from the relative large amount of data may limit the merchant's ability to detect such events.

BRIEF DESCRIPTION

In one aspect, an event detection (ED) computing device is provided. The ED computing device includes a processor in communication with a memory. The processor is configured to receive real time data from a real time data source, including location data and transaction data, and calculate a first data derivative based at least in part on the received location data and transaction data. The ED computing device is also configured to identify an event, associated with a location, based at least in part on the received location data and transaction data, and store an identified event data structure (e.g., event data record) in a database. The identified event data structure includes data derivatives and location identifiers. The ED computing device is configured to retrieve notification rules associated with a first stakeholder, compare the a data derivative to the notification rules, and transmit a notification to the first stakeholder based at least in part on the comparison.

In another aspect, a computer-based method for detecting location-related events is provided. The method is implemented using an event detection (ED) computing device in communication with a memory. The method includes receiving real time data from a real time data source, including location and transaction data, calculating a first data derivative based at least in part on the received location data and transaction data. The method further includes identifying an event, associated with a location, based at least in part on the received location data and transaction data, and storing an identified event data structure in a database. The identified event data structure includes data derivatives and location identifiers. The method also includes retrieving notification rules associated with a first stakeholder based at least in part on the location data, comparing a first data derivative to the notification rules, and transmitting a notification to the first stakeholder based at least in part on the comparison.

In yet another aspect, a non-transitory computer readable medium that includes computer executable instructions for detecting location-related events is provided. When executed by an event detection (ED) computing device, the computer executable instructions cause the ED computing device to receive real time data from a real time data source, including location data and transaction data, and calculate a first data derivative based at least in part on the received location data and transaction data. The computer executable instructions further cause the ED computing device to identify an event, associated with a location, based at least in part on the received location data and transaction data, and store an identified event data structure in a database. The identified event data structure includes data derivatives and location identifiers. the computer executable instructions also cause the ED computing device to retrieve notification rules associated with a first stakeholder, compare the a data derivative to the notification rules, and transmit a notification to the first stakeholder based at least in part on the comparison.

BRIEF DESCRIPTION OF THE DRAWINGS

FIGS. 1-7 show example embodiments of the methods and systems described herein.

FIG. 1 is a simplified block diagram of an example computer system used for detecting location-related events.

FIG. 2 is a message flow chart of an example implementation of the system shown in FIG. 1.

FIG. 4 illustrates an example configuration of a user computer device that may be used with the system shown in FIG. 1.

FIG. 5 illustrates an example configuration of a server computing device that may be used with the system shown in FIG. 1.

FIG. 6 is a data flow diagram of an example method for detecting location-related events.

FIG. 7 is a diagram of components of one or more example computing devices that may be used in embodiments of the described systems and methods.

DETAILED DESCRIPTION

Figure 1:
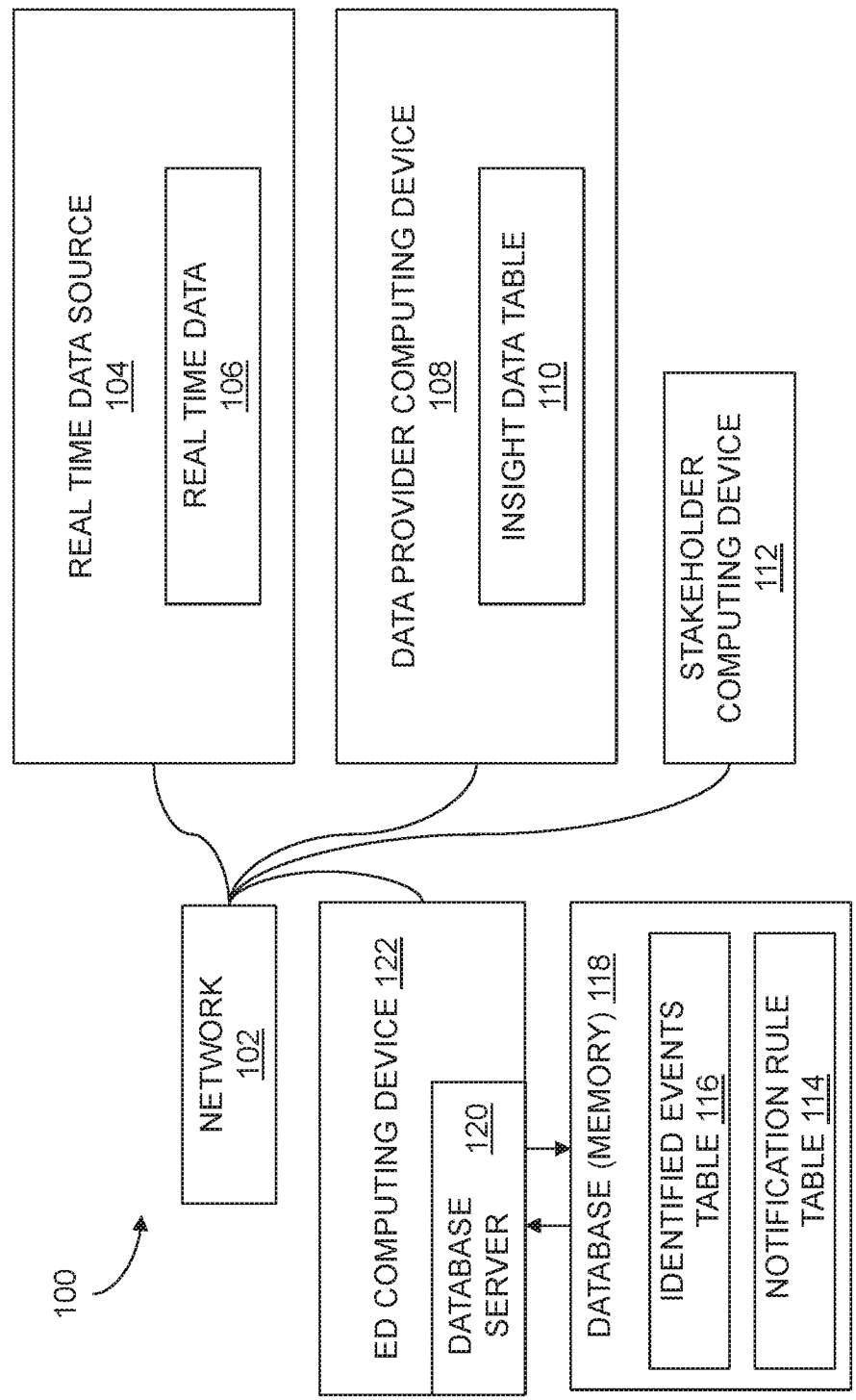

Embodiments of the present disclosure relate generally to systems and methods for detecting location-related events based at least in part on real time data. In one embodiment, an event detection (ED) computing device is provided.

The ED computing device is configured to detect location-related events using data derivatives. The ED computing device calculates data derivatives based on real time data, and included location information. Calculating data derivatives may include calculating changes in aggregated (e.g., summed, averaged) real time data. In response to identifying an event, the ED computing device is configured to store an identified event data structure (e.g., event data record) in a database, maintaining a record of identified events. The ED computing device is also configured to notify stakeholders of detected events, using notification rules. The ED computing device is configured to store notification rules associated with stakeholders, compare the notification rules to identified events, and transmit notifications to stakeholders based on the comparison.

The ED computing device is configured to receive real time data, from a real time data source. In some aspects, real time data may include a series of transactions. In other aspects, real time data may include receiving a series of messages. In some embodiments, the messages include key value pairs, wherein the key (i.e., field, parameter) identifies a type of value (e.g., dollar amount, timestamp) to the ED computing device. In certain embodiments, the ED computing device is in communication with a plurality of real time data sources. In some embodiments, real time data sources are broadcast over a network, and received by the ED computing device. Real time data includes information used to generate results (i.e., data derivatives), wherein the accuracy or usefulness of the data degrades as processing delays increase. For example, information received substantially subsequent to the data being generated (e.g., a payment card transaction) may reduce the accuracy of events detected. In some embodiments, the ED computing device is configured to process data within a short period of time (e.g., from about milliseconds to minutes, as opposed to a matter of days) so that the data output and/or input is available virtually immediately.

In some embodiments, the ED computing device is configured to receive payment card transaction information, including payment amounts, payment card identifiers, and merchant identifiers. In one embodiment, the ED computing device is an integral component of a payment network processing payment card transactions. In another embodiment, the ED computing device is connected to a payment network, and receives payment transaction data in near real time. For example, the ED computing device may receive payment transaction identifiers shortly (e.g., within seconds or milliseconds) after a payment transaction is processed by the payment network. In other embodiments, the ED computing device is configured to receive real time data including travel reservation information (e.g., flight reservations, hotel reservations). In yet other embodiments, the ED computing device is configured to receive real time data including both payment card transaction information and travel reservation information.

In some embodiments, the ED computing device is configured to retrieve insight data associated with data received through a real time data source. In certain embodiments, the ED computing device is configured to retrieve insight data based on lookup values (e.g., key values, record identifiers) included in the real time data, wherein the lookup is associated with data stored by a data provider computer system. Key values may include payment card identifiers, transaction identifiers, account identifiers, ticket identifiers, reservation identifiers, trip identifiers, and the like. For example, the ED computing device may query a data provider computing device with lookup values, to retrieve insight data.

Insight data may include an associated zip code, destination, card product, or customer name. Additionally or alternatively, insight data includes associated products and/or categories. For example, associated products and/or categories may include grocery stores, airline carriers, gas stations, and the like.

In one embodiment, the ED computing device may retrieve insight data based on a customer identifier for an associated airline carrier. For example, the ED computing device may retrieve a customer's frequent flyer status associated with an airline. In one example embodiment, in which the real time data source includes payment transaction information, insight data may include payment card type (e.g., platinum, secured), estimated spending total, and available credit. In another example embodiment, in which the real time data source includes reservation information, insight data may include event start time, event end time, event location, and event category. In one embodiment, where the ED computing device receives real time data including payment card transactions, insight data includes payment card transaction history.

In some embodiments, insight data may include payment transaction addendum data. Payment transaction addendum data includes information generated during the processing of a payment card transaction. In one embodiment, payment transaction addendum data includes travel information, such as flight numbers, travel dates, destination and departure locations, and the like. In another embodiment, payment transaction addendum data includes purchase information, including gallons of fuel purchased, transaction location information, indicators, and the like. In some embodiments, payment transaction addendum data includes cross-border indicators identifying transactions processed in multiple regions and/or countries. Cross-border indicators include, but are not limited to, currency indicators, country codes, international transaction flags, and the like. For example, insight data may include payment addendum data indicating a transaction was processed internationally, and was converted between currencies.

The ED computing device is configured to calculate data derivatives based on real time data, wherein the real time data includes location data. Additionally or alternatively, the ED computing device is configured to calculate data derivatives based on insight data. The data derivatives include a data type and an aggregation specification. In some embodiments, the data type includes a field, parameter, or column in information received from the real time data source. An aggregation specification includes calculating an average, count, density, conditional count (e.g., count if), and the like.

In one embodiment, the ED computing device is connected to a real time data source (e.g., database, web socket connection, etc.) providing payment card transaction data, and the data derivatives include an average of transaction amounts, a count of transactions over a threshold, a percentage of transactions over a certain amount, and the like. In another embodiment, the ED computing device is connected to a real time data source providing transit information, and the data derivatives include a count of arrivals from a specific location, an average time of departure for a specific location, a number of arrivals with a certain ticket class, and an average delay time. In at least some embodiments, the ED computing device is communicatively coupled to a plurality of real time data sources to receive various types of real time data for calculating the data derivatives.

In some embodiments, the ED computing device is configured to calculate data derivatives on a continual basis, and update the data derivatives as information is received from the real time data source. For example, the ED computing device may be configured to calculate the average transaction amount within the past hour, or a count of transit arrivals (e.g., aggregate of tickets issued for arriving flights) within the last 30 minutes. In some embodiments, the ED computing device is configured to maintain a record of data derivatives over time. For example, the ED computing device may be configured to record the change in average transaction amount over time (e.g., past month, past 24 hours, past 5 years).

The ED computing device is further configured to calculate data derivatives based on location data included in the real time data. Location data includes zip code, physical address, geographic coordinate, country/state code, and the like. In one embodiment, the ED computing device is configured to calculate a plurality of data derivatives based on zip codes included in the associated real time data. For example, the ED computing device may calculate the average transaction amount for each zip code represented in the real time data. In some embodiments, the ED computing device computing device is configured to calculate a plurality of data derivatives using a "group by" or "grouping" query to sort and/or organize location data, wherein the query includes an aggregation function acting on the real time data. For example, the ED computing device may execute a query selecting payment card transaction data, grouping by zip code, and aggregating transaction amounts.

The ED computing device is configured to identify events in a geographic region using the calculated data derivatives. In one embodiment, the ED computing device is configured to identify when a data derivative exceeds a threshold to identify an event. For example, the ED computing device may be configured to identify when more than 25% of transit arrivals in an airport are delayed. In another embodiment, the ED computing device is configured to identify changes in data derivatives. For example, the ED computing device may be configured to identify when the average transaction amount in a neighborhood decreases by 10%. In certain embodiments, the ED computing device is configured to detect rates of change in data derivatives. For example, the ED computing device may be configured to detect when the average number transit arrivals is decreasing by more than 5% per hour.

The ED computing device is configured to store information associated with identified event in a database as an event data structure. In certain embodiments, the event data structure may include an event data record stored within a database table. The event data structure includes at least a location identifier and a data derivative. In one embodiment, the ED computing device creates an event data structure including an identification timestamp and least one location identifier (e.g., zip code) of the event. In some embodiments, the event data structure may contain a plurality of zip codes. Additionally or alternatively, the location identifier may include a latitude/longitude coordinate and a radius. In some embodiments, the event data structure (e.g., event data record) further includes any number of data derivatives associated with the location identifier. For example, the ED computing device may identify an event based on an increase in average transaction amount and may further store information associated with the event as a data structure including the average number of transactions per hour in addition to the average transaction amount and the location identifier. In some embodiments, the ED computing device is further configured to include at least one event time in the identified event based on retrieved insight data. The event time may include, for example, a first seating, flight departure, event identification time, a flight arrival, event closing, and the like. For example, the ED computing device may include the time the event was identified based on the associated data derivatives, and an estimated end time of the event.

The ED computing device is configured to retrieve notification rules based on an identified event. Notification rules include at least one location identifier, and at least one stakeholder device identifier (e.g., phone number, IP address, host name, e-mail). In some embodiments, notification rules further includes additional data derivative thresholds associated with a data derivative. For example, a notification rule may include a zip code, a telephone number, and a specification that notifications be based on an average transaction amount exceeding $100. In one embodiment, the ED computing device queries a database associated with the ED computing device based on the location identifier included in the identified event, and the query is configured to return notification rules. For example, the ED computing device may retrieve rules associated with a geographic area.

The ED computing device is configured to compare data derivatives to notification rules. In one example, the ED computing device compares a data derivative to a data derivative threshold included in a notification rule, to determine if the data derivative meets and/or exceeds the notification rule. For example, the ED computing device may determine that a data derivative that includes a $125 transaction average meets/exceeds a notification rule that includes a $100 transaction average threshold.

The ED computing device is configured to provide event notifications to stakeholder devices based on retrieved notification rules. In one embodiment, the ED computing device transmits at least part of the identified event data structure (e.g., event data record) to a stakeholder based on a retrieved rule. The ED computing device is configured to generate and/or transmit notifications based on the retrieved notification rule. For example, after an event has been matched with a retrieved notification rule including an e-mail address, the ED computing device may encode the identified event into an e-mail, and further transmit the e-mail to the e-mail address.

In some embodiments, the ED computing device is configured to provide location-related event data to stakeholder computing devices. In one embodiment, the ED computing device is configured to provide an application program interface (API), such that the ED computing device may receive requests for location-related event data, and further transmit responses including location-related event data structures. For example, a merchant may transmit an API request to the ED computing device including a request for identified events within a location identified In certain embodiments, the ED computing device is configured to receive API requests including location data from a stakeholder computer device. In some embodiments, the location data identifies multiple geographic regions. As used herein, API request includes a request for a resource (e.g., data derivative, identified event data record, etc.) available from the ED computing device. In some embodiments, the ED computing device receives API requests formatted as Hypertext Transfer Protocol (HTTP) requests including a stakeholder identifier (e.g., IP address, API key) and an API endpoint indicating the data requested. For example, the ED computing device may receive a HTTP request including an API key associated with a stakeholder, and a location identifier.

In some embodiments, the ED computing device is configured to transmit an API response, including any number of identified events associated with the location data included in the API request. In such embodiments, the ED computing device is configured to retrieve identified event data structures (e.g., event data records) based on a received API request. In one embodiment, the ED computing device queries stored event data structures based on a location identifier (e.g., zip code) included in an API request. In some embodiments, the ED computing device transmits API responses as HTTP responses. In one embodiment, the ED computing device transmits a formatted (e.g., XML, JSON) HTTP response including a plurality of identified event data structures.

In some embodiments, the ED computing device is configured to include in the API response a computer visualization based on an identified event. Computer visualization includes an encoded image (e.g., JPEG, PNG), instructions for generating an image (e.g., XML, JSON) and the like. In one embodiment, an API response includes a first data derivative associated with an identified event, and further includes a computer visualization of a second data derivative, associated with the first data derivative. For example, an API response may include the average number of transactions in an identified geographic area, and a pie chart (or other visual graphic/chart) including the percentages of transactions occurring in the area within a certain transaction amount range.

In certain embodiments, the ED computing device is configured to include interactivity instructions in a computer visualization. In some embodiments, interactivity instructions include a visualization segment identifier (e.g., interactive regions) and an associated API request. In one exemplary embodiment, in computer visualization specifying a pie chart, interactivity instructions may include an identifier of a chart slice and an associated API request, wherein the API request includes retrieving additional data associated with the selected chart slice. For example, a chart may include, amongst a plurality of regions, an interactive region labelled "Premium Cardholders" associated with an API request including requesting a second chart including the average transaction amount of premium cardholders over time.

In one aspect, the ED computing device receives real time data including payment transaction information such as payment card identifiers, transaction amounts, and zip codes. In some embodiments, the ED computing device may retrieve insight data including payment transaction addendum data based on the payment transaction information (i.e., real time data), such as an average transaction amount associated with a payment card. The ED computing device may calculate data derivatives including the average transaction amount per zip code over time and the average number of transactions per zip code over time. The ED computing device may be configured to detect events when a data derivative changes. For example, the ED computing device may detect a location-related event when the average number of transactions per hour within a zip code increases by 20%. The ED computing device may store an identified event data record, and may further generate notification based on the identified event.

In another aspect, the ED computing device stores a notification rule associated with a stakeholder (e.g., an airport restaurant, train station taxi provider) including sending an e-mail to the stakeholder when the average number of passenger arrivals at an airport per hour exceeds 50. The ED computing device receives real time data including flight reservations, and generates data derivatives including passenger arrivals per hour based on airport (i.e., geographic location). The ED computing device may determine that the number of passenger arrivals will exceed 50 within the next hour, and may further transmit an e-mail including a visualization of the number of passenger arrivals over time, and the average transaction amount of passengers arriving at the airport.

At least one technical problem with known systems is that, in view of the volume of financial transactions and the diversity of merchants processing transactions, it can be difficult, time-consuming, and/or resource-intensive to detect location-related events in payment transaction data. The data available to one merchant may have insufficient scope and/or scale to detect location-related events in near real-time. Additionally, the value of detecting location-related events may be dependent on the processing speed. Events detected promptly may allow a merchant to allocate additional resources. The embodiments described herein address at least these technical problems. By processing real-time data in the manner described in this disclosure, some embodiments improve user experience, user efficiency, and/or user interaction performance by using real-time data including payment transaction information to detect location-related events. Additionally or alternatively, some embodiments potentially reduce the processing time required to detect events. In this manner, the embodiments described herein may facilitate achieving a balance between prompt and accurate location-related event detection. Additionally, some embodiments may reduce processor load by reducing an amount of data to be analyzed or processed, reduce network bandwidth usage and/or improve communication between systems by utilizing data-derivatives to aggregate real-time data while still providing for location-related event detection. In some embodiments, the subject matter described herein may facilitate increasing processor speed and/or improving operating system resource allocation by generating and processing parallelizable data queries, including generating multiple location-related data derivatives simultaneously using distributed aggregation (e.g., group by queries).

The technical effect of the systems and methods described herein is achieved by performing at least one of the following steps: (a) receiving real time data from a real time data source, including location and transaction data; (b) calculating a first data derivative based at least in part on the received location data and transaction data; (c) identifying an event associated with the first location based at least in part on the received location data and transaction data; (d) storing an identified event data record in a database, wherein the identified event data record includes at least one data derivative and at least one location identifier; (e) retrieving notification rules associated with a first stakeholder based at least in part on the location data; (f) comparing the first data derivative to the notification rules; and (g) transmitting a notification to the first stakeholder based at least in part on the comparison.

The resulting technical effect achieved by the systems and methods described herein is at least one of: (i) prompt identification of location-related events, (ii) improved location-related event detection based on data derivatives calculated from real time transaction data, (iii) improved event detection processing time for large amounts of real-time transaction data, and (iv) enhanced identification and notification of relevant stakeholders. These solutions are necessarily tied to a computing device, specifically the ED computing device described herein.

Described herein are computer systems such as device ED computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

FIG. 1 is an example diagram of a location-related event detection system 100. In the example embodiment, system 100 includes ED computing device 122.

ED computing device 122 is connected to network 102, and includes at least one database (e.g., memory) 118 associated with a database server 120. Although the ED computing device is shown as a single computing device, ED computing device 122 may be a plurality of computing devices communicatively coupled together that operate together to perform the functions described herein (i.e., a distributed computing system). ED computing device is configured to be connected to network 102, and capable of bidirectional communication with other computing devices attached to network 102. In some embodiments, network 102 may include a payment network processing payment card transactions. In other embodiments, network 102 may be in communication with a payment network.

In the example embodiment, database 118 includes an identified events table 116, storing identified event data structures (e.g., event data records), and notification rule table 114, storing notification rules. In some embodiments, identified events data table 116 includes a data derivative, a timestamp, and a location identifier (e.g., zip code). For example, identified events data table 116 may include the zip code of an area where the average transaction amount has increased by 20%, and the time the event was detected. In certain embodiments, notification rule table 114 includes a location identifier, a stakeholder device identifier (e.g., phone number, e-mail address), and a notification threshold. Notification threshold may include a specification of a threshold associated with a data derivative, such as a minimum of 120 transactions per hour within a zip code, or a 15% increase in average transaction amount at an airport.

Real time data source 104 is connected to network 102. In the example embodiment, real time data source 104 is configured to store real time data 106, and is further configured to transmit real time data 106 using network 102. In one embodiment, real time data 106 includes payment card transaction information. For example, real time data 106 may include payment card transactions recently processed by a payment card network. Additionally or alternatively, real time data 106 includes travel reservation information. In certain embodiments, real time data source 104 generates real time data 106. In other embodiments, real time data source 104 stores and/or manages real time data 106.

Data provider computing device 108 is connected to network 102. In the example embodiment, data provider computing device 108 includes insight data table 110 for storing insight data. Stakeholder computing device 112 is connected to network 102. In the example embodiment, stakeholder computing device 112 is in communication with ED computing device 122. In some embodiments, data provider computing device 108 includes a computer system storing payment transaction addendum data, wherein the addendum data includes travel reservation associated with payment card transactions. In other embodiments, data provider computing device 108 includes a computer system storing payment card history and/or payment card trends. In certain embodiments, ED computing device 122 is configured to query multiple data provider computing devices. In some embodiments, ED computing device 122 stores multiple types of insight data.

Figure 2:
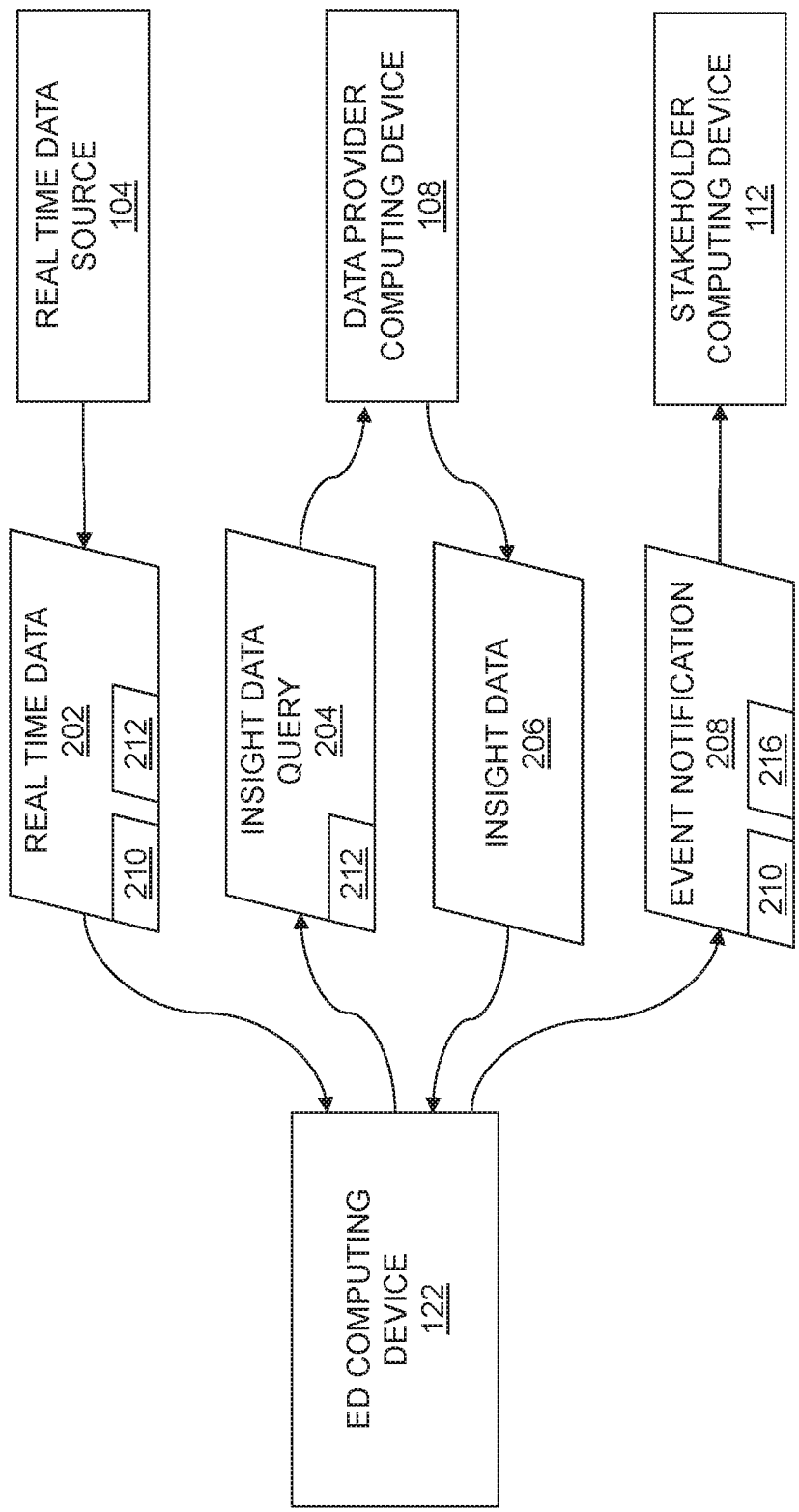

FIG. 2 is a message flow chart of an example implementation of the system shown in FIG. 1. ED computing device 122 is configured to receive real time data 202 from real time data source 104, including location data 210 and a lookup value (i.e., record identifier) 212. Real time data 202 includes payment card transactions, travel reservations, and the like. In some embodiments, real time data source 104 includes a computer system processing payment transactions. Additionally or alternatively, real time data source 104 includes a computer system processing travel reservations. In some aspects, ED computing device 122 receives real time data 202 in near real-time, such that the data is received by the ED computing device 122 shortly after it was generated by (or otherwise made available to) the real time data source 104. Additionally or alternatively, the real time data source 104 may transmit real time data 202 in batches. In one embodiment, where real time data source 104 is in communication with a payment network, real time data 202 includes a payment card identifier and a merchant identifier, wherein the merchant identifier is associated with a geographic location.

In some embodiments, ED computing device 122 is configured to retrieve insight data. Insight data includes payment transaction addendum data, payment transaction history data, trend data, and the like. In one embodiment, ED computing device 122 is configured to transmit an insight data query 204 to data provider computing device 108, including lookup value 212. ED computing device 122 is configured to generate insight data query 204, based at least in part on real time data 202. In one embodiment, where lookup value 212 includes a payment card identifier, ED computing device is be configured to generate a query for payment card transaction history associated with the payment card identifier. In another embodiment, lookup value 212 includes a customer identifier (e.g., phone number, e-mail address, etc.), and the insight data query 204 is configured to retrieve insight data associated with the customer. In certain embodiments, ED computing device 122 is configured to specify multiple lookup values in insight data query 204.

In some embodiments, ED computing device 122 is configured to retrieve insight data 206 from data provider computing device 108 in response to insight data query 204, wherein insight data 206 is associated with lookup value 212. In one embodiment, where data provider computing device 108 is a component of a payment network, insight data 206 may include transaction history associated with a payment card identifier (i.e., lookup value 212). In another embodiment, where data provider computing device 108 processes travel reservations, insight data 206 may include travel reservations (e.g., departure date, arrival date, departure location, arrival location) associated with an e-mail address (i.e., lookup value 212).

ED computing device 122 is configured to transmit an event notification 208 to stakeholder computing device 112. Event notification 208 includes location data 210 and data derivative 216. In one embodiment, ED computing device 122 transmits at least part of an identified event data structure (e.g., event data record) to a stakeholder based on a notification rule. For example, ED computing device 122 may transmit an e-mail and/or SMS text message to stakeholder computing device 112, including an average transaction amount (i.e., data derivative 216), and a zip code (i.e., location data 210).

Figure 3B:
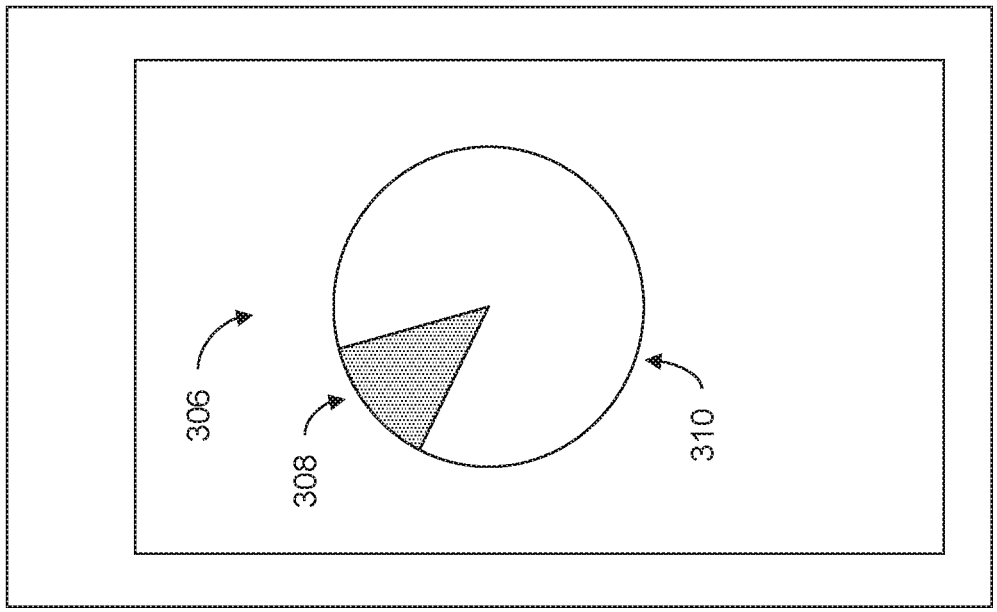
FIG. 3B is an example screenshot of a stakeholder computing device as shown in FIG. 1.
Figure 3A:
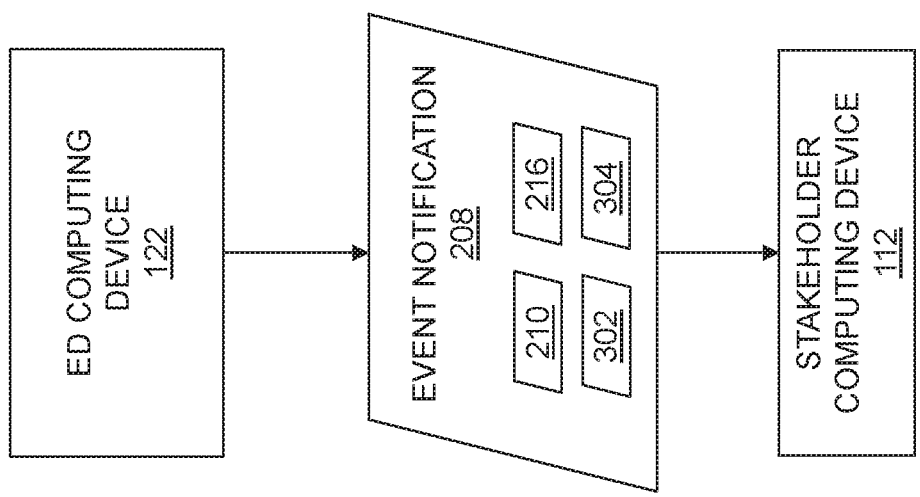
FIG. 3A is a message flow chart of an example implantation of the system shown in FIG. 1.

FIG. 3A is a message flow chart of an example implementation of the system shown in FIG. 1, wherein the ED computing device 122 is configured to transmit event notifications including data derivative computer visualizations. ED computing device 122 is configured to transmit an event notification 208 to stakeholder computing device 112. The event notification 208 includes location data 210 and data derivative 216. In some embodiments, event notification 208 is configured to include visualization instructions 302 and interactivity instructions 304. For example, visualization instructions 302 may include XML-formatted instructions for displaying a pie chart with any number of chart segments based at least in part on data derivative 216, and interactivity instructions 304 may specify a chart segment and an associated API request.

FIG. 3B is an example screenshot of stakeholder computing device 112 as shown in FIG. 1. In some embodiments, stakeholder computing device 112 is configured to receive an event notification 208 including visualization instructions 302 and interactivity instructions 304 as shown in FIG. 3A. Stakeholder computing device 112 is configured to generate computer visualization 306, including chart segment 308 and chart segment 310 on visualization instructions 302. Stakeholder computing device 112 is further configured to associate chart segment 308 with an API request based on interactivity instructions 304. In one embodiment, event notification 208 causes stakeholder computing device 112 to display a pie chart (e.g., computer visualization 306), including a percentage of premium cardholders (chart segment 308) and a percentage of standard cardholders (chart segment 310). Additionally, chart segment 308 may be interactive and linked to a request for additional data derivatives related to premium cardholders.

Figure 4:
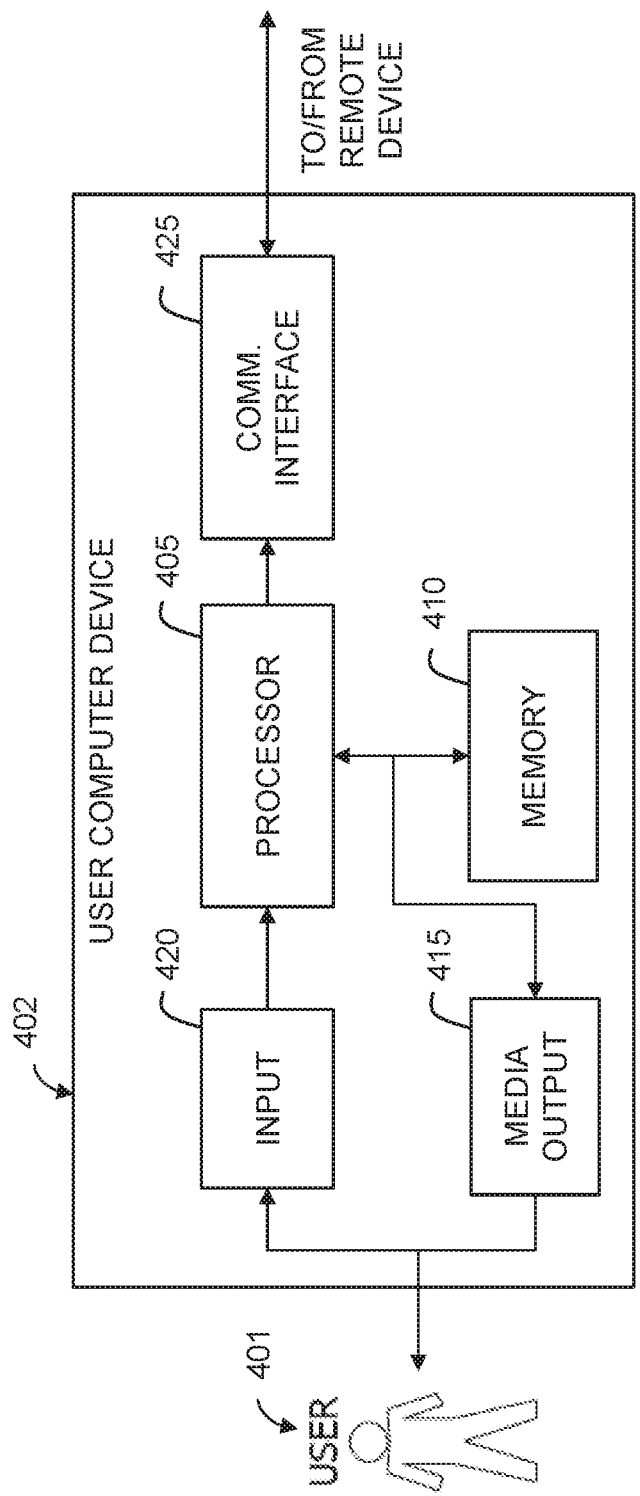

FIG. 4 depicts an exemplary configuration of a remote or user computing device 402, such as stakeholder computing device 112 (shown in FIG. 1). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 401. Media output component 415 may be any component capable of conveying information to user 401. In some embodiments, media output component 415 may include an output adapter, such as a video adapter and/or an audio adapter. An output adapter may be operatively coupled to processor 405 and operatively coupleable to an output device, such as to a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 401.

In some embodiments, computing device 402 may include an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 40. A user interface may include, among other possibilities, a web browser and client application. Web browsers enable users 401 to display and interact with media and other information typically embedded on a web page or a website from a web server. A client application allows users 401 to interact with a server application associated with, for example, a vendor or business.

Figure 5:
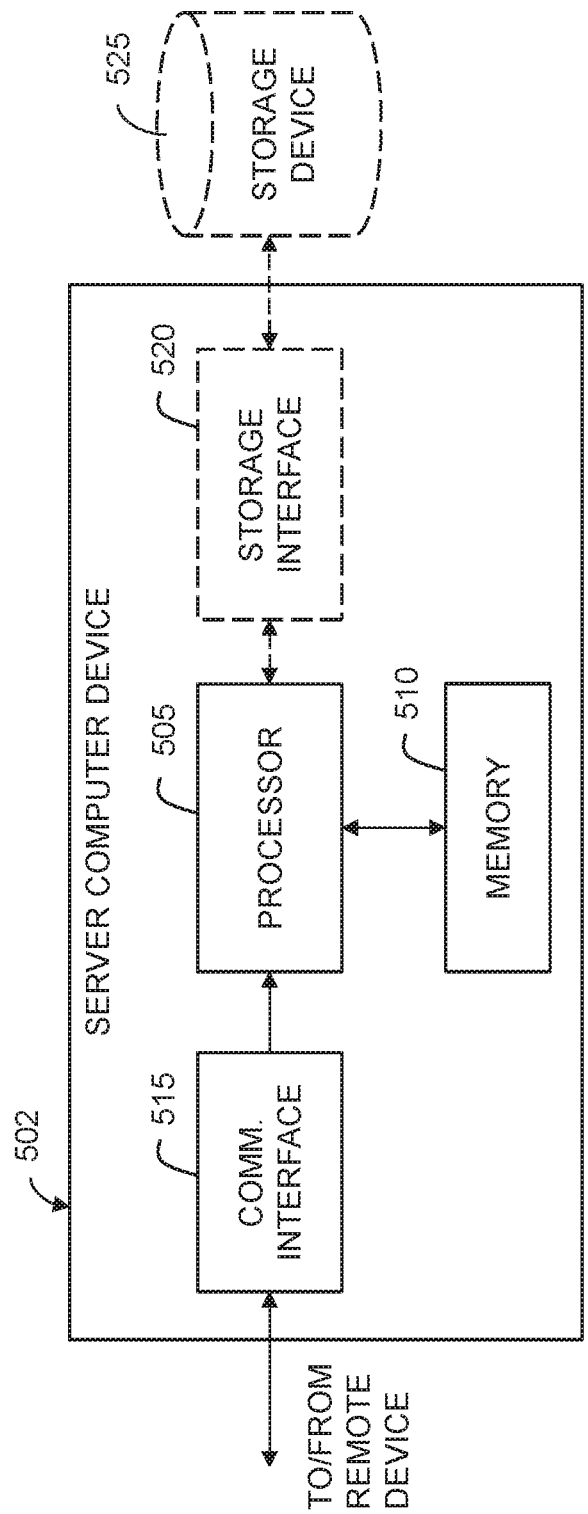

FIG. 5 depicts an exemplary configuration of a host computing device 502, such as ED computing device 122 (shown in FIG. 1), real time data source 104, and data provider computing device 108. Host computing device 502 may include a processor 505 for executing instructions. Instructions may be stored in a memory area 510, for example. Processor 505 may include one or more processing units (e.g., in a multi-core configuration).

Processor 505 may be operatively coupled to a communication interface 515 such that host computing device 502 may be capable of communicating with a remote device such as stakeholder computing device 112 shown in FIG. 1. For example, communication interface 515 may transmit notifications to stakeholder computing device 112 over network 102 (both shown in FIG. 1).

Processor 505 may also be operatively coupled to a storage device 525 (e.g., database 118, shown in FIG. 1). Storage device 525 may be any computer-operated hardware suitable for storing and/or retrieving data. In some embodiments, storage device 525 may be integrated in host computing device 502. For example, host computing device 502 may include one or more hard disk drives as storage device 525. In other embodiments, storage device 525 may be external to host computing device 502 and may be accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
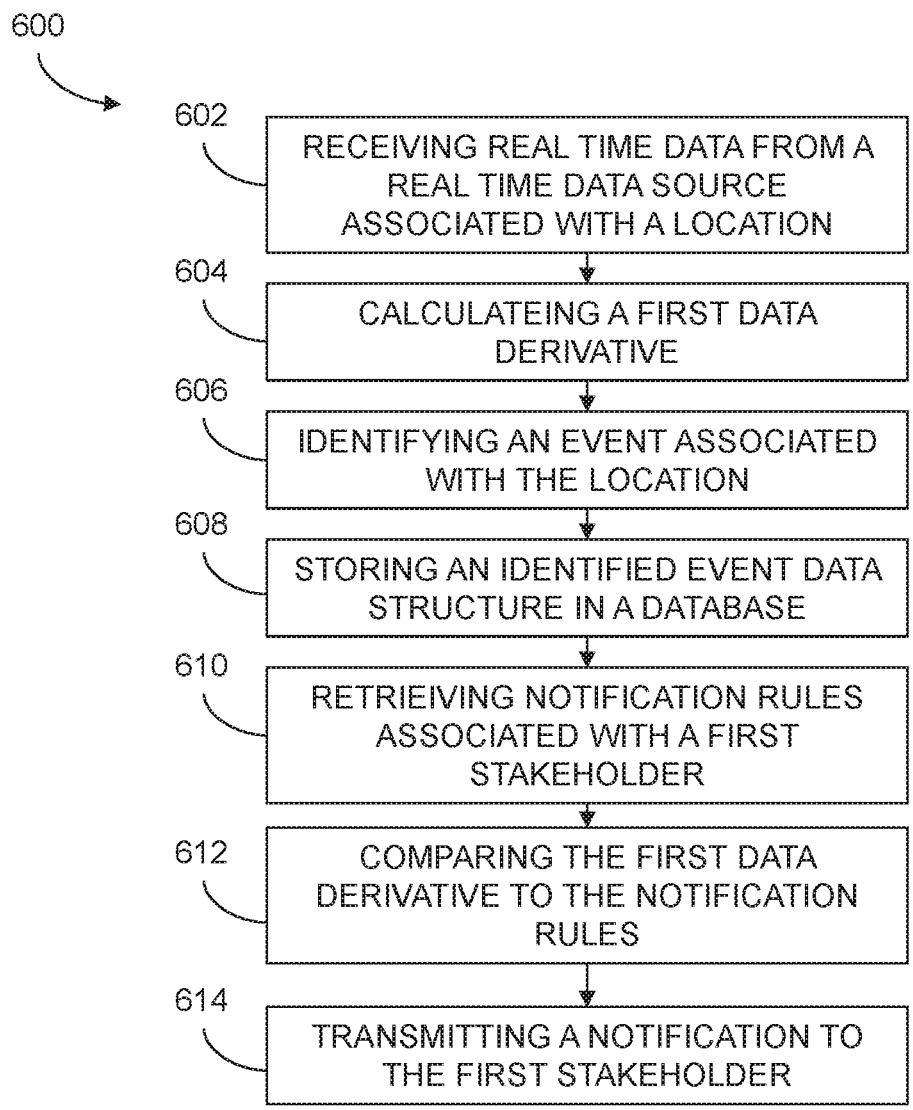

FIG. 6 is a flow diagram of an example method 600 for detecting location-related events. Method 600 may be performed using an ED computing device 122 (shown in FIG. 1). In the example embodiment, method 600 is at least partially performed by an ED computing device. In other embodiments, method 600 includes additional, fewer, or alternative steps, including those described elsewhere herein.

Method 600 includes the ED computing device receiving 602 real time data from a real time data source, wherein the real time data includes location data identifying a first location and transaction data for transactions at the first location, and calculating 604 a first data derivative based at least in part on the received location data and transaction data. Method 600 further includes identifying 606 an event associated with the first location based at least in part on the received location data and transaction data, and storing 608 an identified event data structure in a database, wherein the identified event data structure includes at least one data derivative and at least one location identifier. Method 600 includes retrieving 610 notification rules associated with a first stakeholder based at least in part on the location data and comparing 612 the first data derivative to the notification rules. Method 600 further includes transmitting 614 a notification to the first stakeholder based at least in part on the comparison.

Figure 7:
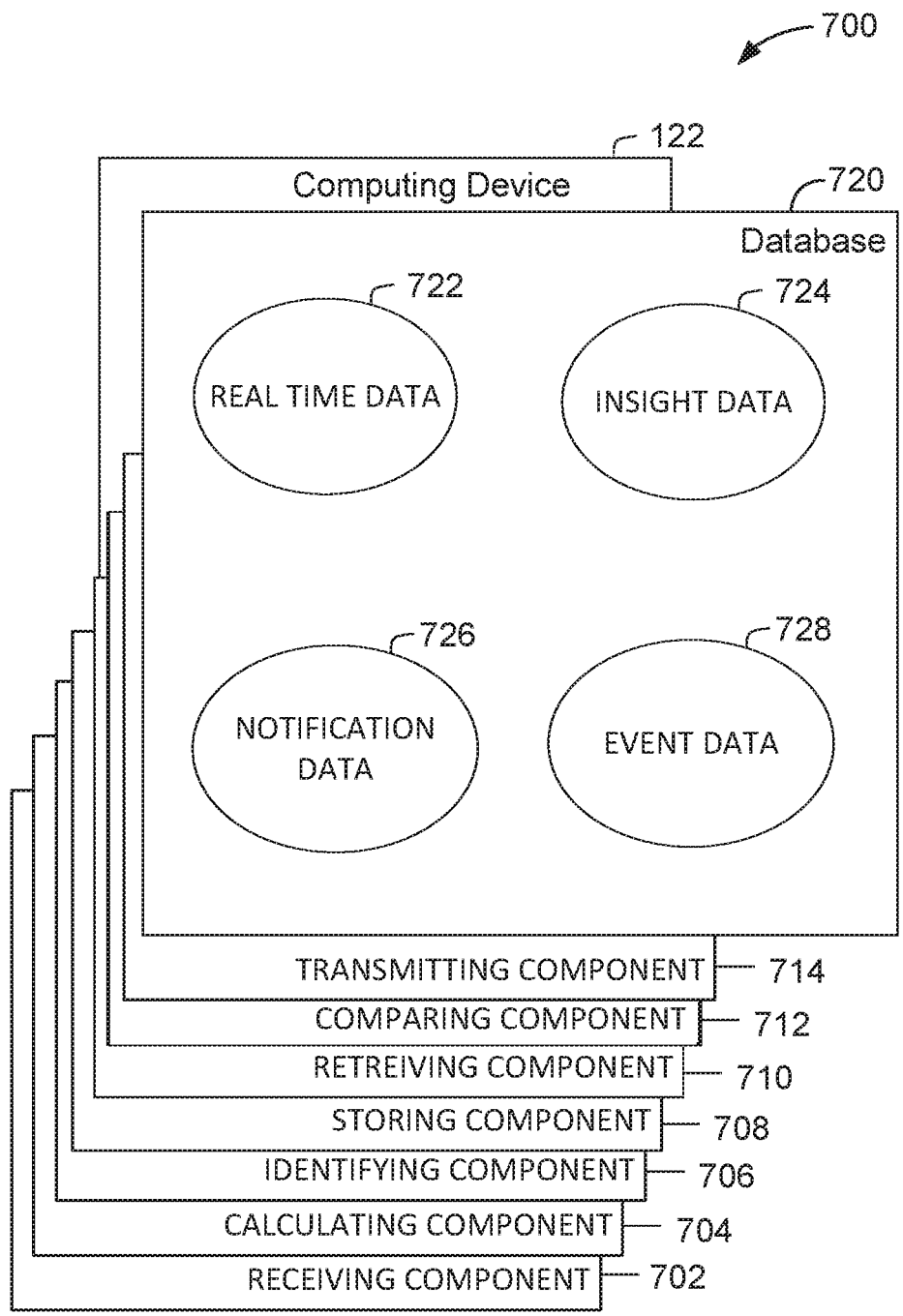

FIG. 7 is a diagram 700 of components of one or more example computing device that may be used in the method shown in FIG. 6. FIG. 7 further shows a configuration of a database system 720 including at least ED computing device 122 (shown in FIG. 1). Database system 720 is coupled to several separate components within ED computing device 122 which perform specific tasks.

ED computing device 122 includes a receiving component 702 configured to receiving real time data from a real time data source including location and transaction data. ED computing device 122 further includes a calculating component 704 configured to calculate a first data derivative based at least in part on the received location data and transaction data. ED computing device further includes an identifying component 706 configured to identify an event associated with the first location based at least in part on the received location data and transaction data, and a storing component 708 configured to store an identified event data structure in a database. The identified event data structure includes data derivatives and location identifiers. ED computing device 122 further includes a retrieving component 710 configured to retrieve notification rules associated with a first stakeholder based at least in part on the location data, a comparing component 712 configured to compare a first data derivative to the notification rules, and a transmitting component 714 configured to transmit a notification to the first stakeholder based at least in part on the comparison.

In an exemplary embodiment database system 720 is divided into a plurality of sections, including but not limited to, real time data section 722, insight data section 724, notification data section 726, and event data section 728. Notification section 726 includes notification rules, and event data section 728 includes identified event data structures.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

Embodiments described herein may relate to a transaction card system, such as a credit card payment system using the Mastercard interchange network. The Mastercard interchange network is a set of proprietary communications standards promulgated by Mastercard International Incorporated for the exchange of financial transaction data and the settlement of funds between financial institutions registered with Mastercard International Incorporated. (Mastercard is a registered trademark of Mastercard International Incorporated located in Purchase, N.Y.).

The preceding detailed description illustrates embodiments of the disclosure by way of example and not by way of limitation. It is contemplated that the disclosure has general application to detecting location-related events.

What is claimed is:

1. An event detection (ED) computing device comprising one or more processors in communication with one or more memory devices, the one or more processors configured to:
    receive real time data from a real time data source, wherein the real time data includes location data identifying a first geographic location and transaction data, the transaction data comprising payment card transaction data for transactions relating to the first geographic location, the transactions initiated by a plurality of individuals;
    calculate in near real-time a first data derivative based at least in part on the received location data and transaction data;
    identify in near real-time an event associated with the first geographic location based at least in part on the received location data and the transaction data;
    store in near real-time an identified event data record in a database, wherein the identified event data record includes at least the first data derivative, a first location identifier from the location data, and the identified event;
    retrieve in near real-time a notification rule based at least in part on the location data, the notification rule specific to a first stakeholder and including one or more derivative thresholds dictated by the first stakeholder;
    compare in near real-time the first data derivative to the notification rule;
    in response to the first data derivative exceeding the one or more derivative thresholds, generate a notification message including visualization instructions, the visualization instructions including XML-formatted instructions that, when executed by a stakeholder computing device, cause the stakeholder computing device to (i) retrieve, from the database via a first API request, a first portion of the location data associated with the identified event, and (ii) generate a computer visualization associated with the identified event using the retrieved first portion of the location data, the notification message further including interactivity instructions that, when executed by the stakeholder computing device, cause the stakeholder computing device to retrieve, from the database via a second API request, a second portion of the location data associated with the identified event, the second portion comprising additional information associated with one of a plurality of segments of the first portion, wherein one of the plurality of segments includes cardholder data of cardholders associated with the payment card transaction data;
    transmit in near real-time the notification message to a first stakeholder computing device associated with the first stakeholder, the XML-formatted instructions causing an application executing on the first stakeholder computing device to transmit the first API request to the ED computing device and generate the computer visualization associated with the identified event using the retrieved first portion of the location data, the computer visualization including a chart representing the retrieved first portion and displayed on the first stakeholder computing device;
    receive the second API request from the first stakeholder computing device in response to a selection, on the first stakeholder computing device, of a segment of the plurality of segments represented on the chart, the selection causing the interactivity instructions to instruct the application to transmit the second API request to the ED computing device; and
    in response to receiving the second API request, transmit the additional information to the first stakeholder computing device, the additional information configured to be displayed on the first stakeholder computing device.

2. The ED computing device of claim 1 wherein the one or more processors are further configured to:
    determine at least one lookup value included in the real time data, wherein the at least one lookup value includes at least one cardholder identifier, each for identifying a cardholder who initiated at least one payment transaction included in the real time data; and
    retrieve insight data from a data provider computing device based at least in part on the at least one lookup value.

3. The ED computing device of claim 2 wherein the first data derivative is based at least in part on the insight data, and wherein the insight data includes card product identifiers associated with each of the at least one cardholder identifier.

4. The ED computing device of claim 2 wherein insight data includes payment card transaction history associated with each cardholder identifier included in the at least one lookup value.

5. The ED computing device of claim 1 wherein the one or more processors are further configured to:
    receive an API request, wherein the API request includes at least one location identifier and a stakeholder device identifier;
    retrieve at least one identified event data record from the database based on the at least one location identifier; and
    transmit an API response based on the stakeholder device identifier, wherein the API response includes the at least one identified event data record.

6. A computer-implemented method for detecting location-related events in near real-time from a real time data source, the method implemented using an event detection (ED) computing device including a processor in communication with a memory, the method comprising:
    receiving real time data from the real time data source, wherein the real time data includes location data identifying a first geographic location and transaction data, the transaction data comprising payment card transaction data for transactions relating to the first geographic location, the transactions initiated by a plurality of individuals;
    calculating in near real-time a first data derivative based at least in part on the received location data and transaction data;
    identifying in near real-time an event associated with the first geographic location based at least in part on the received location data and the transaction data;
    storing in near real-time an identified event data record in a database, wherein the identified event data record includes at least the first data derivative, a first location identifier from the location data, and the identified event;

retrieving in near real-time a notification rule based at least in part on the location data, the notification rule specific to a first stakeholder and including one or more derivative thresholds dictated by the first stakeholder;

comparing in near real-time the first data derivative to the notification rule; and in response to the first data derivative exceeding the one or more derivative thresholds, generating a notification message including visualization instructions, the visualization instructions including XML-formatted instructions that, when executed by a stakeholder computing device, cause the stakeholder computing device to (i) retrieve, via a first API request from the database, a first portion of the location data associated with the identified event, and (ii) generate a computer visualization associated with the identified event using the retrieved first portion of the location data, the notification message further including interactivity instructions that, when executed by the stakeholder computing device, cause the stakeholder computing device to retrieve, via a second API request from the database, a second portion of the location data associated with the identified event, the second portion comprising additional information associated with one of a plurality of segments of the first portion, wherein one of the plurality of segments includes cardholder data of cardholders associated with the payment card transaction data;

transmitting in near real-time the notification message to a first stakeholder computing device associated with the first stakeholder, the XML-formatted instructions causing an application executing on the first stakeholder computing device to transmit the first API request to the ED computing device and generate the computer visualization associated with the identified event using the retrieved first portion of the location data, the computer visualization including a chart representing the retrieved first portion and displayed on the first stakeholder computing device;

receiving the second API request from the first stakeholder computing device in response to a selection, on the first stakeholder computing device, of a segment of the plurality of segments represented on the chart, the selection causing the interactivity instructions to instruct the application to transmit the second API request to the ED computing device; and in response to receiving the second API request, transmitting the additional information to the first stakeholder computing device, the additional information configured to be displayed on the first stakeholder computing device.

7. The method of claim 6 further comprising:

determining at least one lookup value included in the real time data, wherein the at least one lookup value includes at least one cardholder identifier, each for identifying a cardholder who initiated at least one payment transaction included in the real time data; and retrieving insight data from a data provider computing device based at least in part on the at least one lookup value.

8. The method of claim 7 wherein the first data derivative is based at least in part on the insight data, and wherein the insight data includes card product identifiers associated with each of the at least one cardholder identifier.

9. The method of claim 7 wherein insight data includes payment card transaction history associated with each cardholder identifier included in the at least one lookup value.

10. The method of claim 6 further comprising:

receiving an API request from the first stakeholder, wherein the API request includes at least one location identifier and a stakeholder device identifier;

retrieving at least one identified event data record from the database based on the at least one location identifier; and transmitting an API response based on the stakeholder device identifier, wherein the API response includes the at least one identified event data record.

11. A non-transitory computer-readable storage medium having computer-executable instructions embodied thereon, wherein when executed by an event detection (ED) computing device including a processor in communication with a memory, the computer-executable instructions cause the processor to:

receive real time data from a real time data source, wherein the real time data includes location data identifying a first geographic location and transaction data, the transaction data comprising payment card transaction data for transactions relating to the first geographic location, the transactions initiated by a plurality of individuals;

calculate in near real-time a first data derivative based at least in part on the received location data and transaction data;

identify in near real-time an event associated with the first geographic location based at least in part on the received location data and the transaction data;

store in near real-time an identified event data record in a database, wherein the identified event data record includes at least the first data derivative, a first location identifier from the location data, and the identified event;

retrieve in near real-time a notification rule based at least in part on the location data, the notification rule specific to a first stakeholder and including one or more derivative thresholds dictated by the first stakeholder;

compare in near real-time the first data derivative to the notification rule; and in response to the first data derivative exceeding the one or more derivative thresholds, generate a notification message including visualization instructions, the visualization instructions including XML-formatted instructions that, when executed by a stakeholder computing device, cause the stakeholder computing device to (i) retrieve, via a first API request from the database, a first portion of the location data associated with the identified event, and (ii) generate a computer visualization associated with the identified event using the retrieved first portion of the location data, the notification message further including interactivity instructions that, when executed by the stakeholder computing device, cause the stakeholder computing device to retrieve, via a second API request from the database, a second portion of the location data associated with the identified event, the second portion comprising additional information associated with one of a plurality of segments of the first portion;

transmit in near real-time the notification message to a first stakeholder computing device associated with the first stakeholder, the XML-formatted instructions causing an application executing on the first stakeholder computing device to transmit the first API request to the ED computing device and generate the computer visualization associated with the identified event using the retrieved first portion of the location data, the computer visualization including a chart representing the retrieved first portion and displayed on the first stakeholder computing device, wherein one of the plurality of segments includes cardholder data of cardholders associated with the payment card transaction data;

receive the second API request from the first stakeholder computing device in response to selection, on the first stakeholder computing device, of a segment of the plurality of segments represented on the chart, the selection causing the interactivity instructions to instruct the application to transmit the second API request to the ED computing device; and in response to receiving the second API request, transmit the additional information to the first stakeholder computing device, the additional information configured to be displayed on the first stakeholder computing device.

12. The non-transitory computer-readable storage medium of claim 11 wherein the computer-executable instructions further cause the processor to:

determine at least one lookup value included in the real time data, wherein the at least one lookup value includes at least one cardholder identifier, each for identifying a cardholder who initiated at least one payment transaction included in the real time data; and retrieve insight data from a data provider computing device based at least in part on the at least one lookup value.

13. The non-transitory computer-readable storage medium of claim 12 wherein the first data derivative is based at least in part on the insight data, and wherein the insight data includes card product identifiers associated with each of the at least one cardholder identifier.

14. The non-transitory computer-readable storage medium of claim 12 wherein insight data includes payment card transaction history associated with each cardholder identifier included in the at least one lookup value.

15. The non-transitory computer-readable storage medium of claim 11 wherein the computer-executable instructions further cause the processor to:

receive an API request, wherein the API request includes at least one location identifier and a stakeholder device identifier;

retrieve at least one identified event data record from the database based on the at least one location identifier; and transmit an API response based on the stakeholder device identifier, wherein the API response includes the at least one identified event data record.

* * * * *